United States Patent [19]

Moisin et al.

[11] Patent Number: 5,148,087
[45] Date of Patent: Sep. 15, 1992

[54] CIRCUIT FOR DRIVING A GAS DISCHARGE LAMP LOAD

[75] Inventors: Mihail S. Moisin, Lake Forest; John G. Konopka, Barrington, both of Ill.

[73] Assignee: Motorola, Inc., Schaumburg, Ill.

[21] Appl. No.: 705,864

[22] Filed: May 28, 1991

[51] Int. Cl.$^5$ .............................................. H05B 37/00
[52] U.S. Cl. ..................................... 315/291; 315/307; 315/DIG. 7
[58] Field of Search ............... 315/209 R, 209 T, 219, 315/226, 291, 307, DIG. 7

[56] References Cited

U.S. PATENT DOCUMENTS 4,508,996 4/1985 Clegg et al. ..................... 315/219 X
4,873,471 10/1989 Dean et al. ...................... 315/307 X Primary Examiner—Robert J. Pascal
Attorney, Agent, or Firm—Peter Hudson

[57] ABSTRACT

A circuit for driving one or more gas discharge lamps (102, 104, 106) from a nominal-level voltage supply includes: a voltage boost IC (144); a self-oscillating, series-resonant oscillator (196, 198, 178, 180) for producing a high-frequency output voltage for application to the lamps via an output-coupling transformer (212); and a voltage clamp (215A, 215B) coupling the transformer to the oscillator input (174, 176). The voltage boost IC is arranged to regulate the power drawn by the circuit to a constant level if the supply voltage is greater than 95% of its nominal value. If the supply voltage falls to less than 95% of its nominal value, regulation is lost and the circuit draws less power in proportion to the fall in the supply voltage. If the supply voltage falls to less than 90% of its nominal value the clamp operates to reduce the power drawn by the circuit at a rate greater than that of the fall in the supply voltage. The circuit thus enables an electric utility generating the voltage supply to reduce the power drawn by the circuit by reducing the supply voltage to less than 95% of its nominal value.

16 Claims, 2 Drawing Sheets

CIRCUIT FOR DRIVING A GAS DISCHARGE LAMP LOAD

BACKGROUND OF THE INVENTION

This invention relates to circuits for driving gas discharge lamps, and particularly, though not exclusively, to circuits for driving fluorescent lamps.

In a typical prior art circuit for driving a plurality of fluorescent lamps, the lamps are driven from a high-frequency oscillating circuit powered, via a rectifier and an inverter, from an AC voltage supply, e.g. an electric utility mains.

It is well recognized that although the voltage level of an electric utility mains is nominally fixed at known level, e.g. 120 V, the actual voltage level of the mains typically varies in dependence on conditions such as variations in the power drawn by other users from the mains and variations in the available generating capacity. In order to provide uniform lamp operation in the face of variations in the actual mains supply voltage it is usual to control the power drawn from the mains by drawing less or more current so as to produce a constant light output over a wide range of operating conditions. Indeed with the recent move throughout the lighting industry to change from magnetic ballast circuits to electronic ballast circuits for driving fluorescent lamps and with the ease of incorporation of electronic power control in electronic ballast circuits, it is widely considered a mark of good ballast design for a ballast circuit to provide steady light output over a wide range of supply voltage variation both above and below the nominal supply voltage by reducing or increasing the current drawn from the mains supply respectively.

However, while it is desirable that a ballast circuit should provide steady light output by reducing the current drawn if the supply voltage varies over a wide range above its nominal value, the inventors hereof have realized that it may not be generally advantageous for a ballast circuit to increase the current drawn if the supply voltage varies over a wide range below its nominal value. One circumstance in which a fall in mains supply voltage below nominal value may occur is when there is an unexpected drawing of power from other users of the mains. Another circumstance in which a fall in mains supply voltage below nominal value may occur is when the electric utility deliberately reduces the mains voltage; this circumstance may arise if the electric utility has reached a maximum in its generating capacity and needs to reduce the power drawn from the mains in order to maintain the safety of its generating equipment, e.g. to maintain the temperatures of its transformers at a safe level. If the electric utility deliberately reduces the mains voltage in order to reduce the amount of power drawn, such safety action will be rendered ineffective if circuits such as lamp ballasts which are drawing power from the mains respond by increasing their current drawn so as to maintain constant the power which they draw.

SUMMARY OF THE INVENTION

In accordance with the invention there is provided a circuit for driving a gas discharge lamp load, the circuit comprising:

input terminals for connection to a supply voltage source having a predetermined nominal voltage level;

output terminals for connection to the gas discharge lamp load;

oscillator means coupled to the input terminals and to the output terminals for producing a high-frequency output voltage for application to the gas discharge lamp load;

power control means coupled to the input terminals and to the oscillator means for controlling the power drawn by the circuit from the supply voltage source, the power control means comprising:

power reducing means for reducing the power drawn by the circuit when the voltage level of the supply voltage source falls below a first predetermined level less than the nominal level of the supply voltage source; and regulator means for regulating to a substantially constant value the power drawn by the circuit when the voltage level of the supply voltage source is above the first predetermined level, the regulator means comprising current mode control means and an impedance connected therewith, the impedance having a predetermined value which determines the substantially constant value of the power drawn by the circuit when the voltage level of the supply voltage source is above the first predetermined level.

It will be understood that such a circuit reduces the power drawn thereby if the supply voltage falls below a predetermined level less than the nominal level of the supply voltage, allowing reduction of the supply voltage to produce reduction of power drawn from the supply, and so allowing the electric utility to control better its generating equipment and capacity.

BRIEF DESCRIPTION OF THE DRAWINGS

One fluorescent lamp driver circuit in accordance with the present invention will now be described, by way of example only, with reference to the accompanying drawings, in which.

DESCRIPTION OF THE PREFERRED EMBODIMENT

Figure 1:
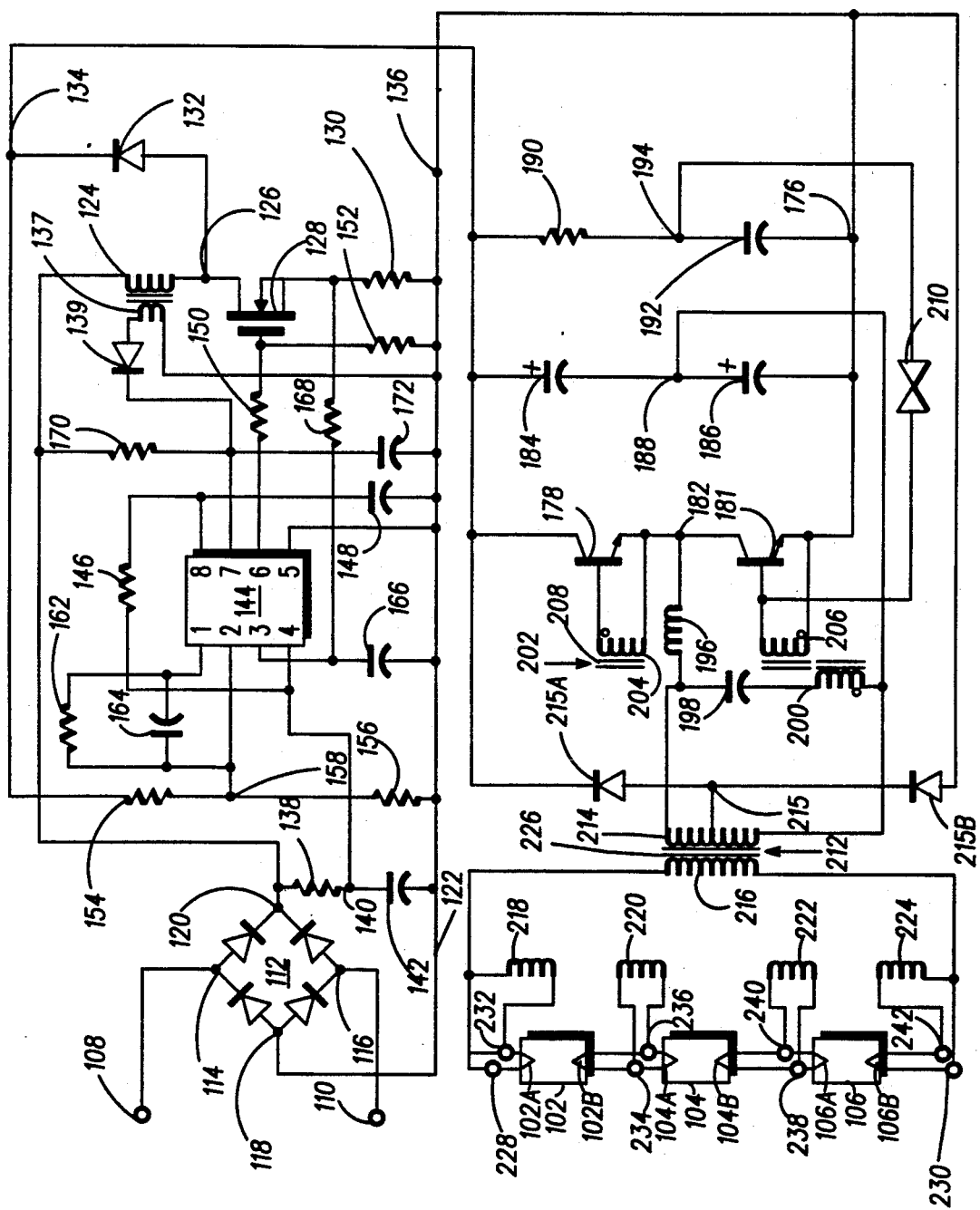
FIG. 1 shows a schematic circuit diagram of a driver circuit for driving three fluorescent lamps.

Referring now to FIG. 1, a circuit 100, for driving three fluorescent lamps 102, 104, 106, has two input terminals 108, 110 for receiving thereacross an AC supply voltage of nominally 120 V at a frequency of 60 Hz. A full-wave rectifying bridge circuit 112 has two input nodes 114, 116 connected respectively to the input terminals 108, 110, and has two output nodes 118, 120. The output node 118 of the bridge 112 is connected to a ground voltage rail 122.

A cored inductor 124 (having an inductance of approximately 750 $\mu$H) has one end connected to the output node 120 of the bridge 112, and has its other end connected to a node 126. A field effect transistor (FET) 128 (of the type IRF 730) has its drain electrode connected to the node 126. The field effect transistor (FET) 128 has its source electrode connected, via a resistor 130 (having a value of approximately 0.51 $\Omega$), to the ground voltage rail 122. A diode 132 (of the type MUR160) has its anode connected to the node 126 and has its cathode connected to an output node 134. The ground voltage rail 122 is connected to an output node 136.

A resistor 138 (having a resistance of approximately 720KΩ) is connected between the output node 120 of the bridge 112 and a node 140. A capacitor 142 (having a capacitance of approximately 0.0039 μF) is connected between the node 140 and the ground voltage rail 122. A current-mode control integrated circuit (IC) 144 (of the type UC2845, available from MOTOROLA Semiconductor) has its $R_T/C_T$ input (pin 4) connected to the node 140. The current mode control IC 144 has its $V_{REG}$ output (pin 8) connected, via a resistor 146 (having a resistance of approximately 10KΩ), to the node 140 and connected, via a capacitor 148 (having a capacitance of approximately 0.22 μF) to the ground voltage rail 122. The current mode control IC 144 has its control signal output (pin 6) connected, via a resistor 150 (having a resistance of approximately 20 Ω), to the gate electrode of the FET 128. The gate electrode of the FET 128 is also connected, via a resistor 152 (having a resistance of approximately 22KΩ), to the ground voltage rail 122.

Two resistors 154, 156 (having respective resistances of approximately 400KΩ and 4.02KΩ) are connected in series, via an intermediate node 158, between the output terminal 134 and the ground voltage rail 122. The current mode control IC 144 has its $V_{FB}$ input (pin 2) connected to the node 158. The current mode control IC 144 has its COMP output (pin 1) connected to its $V_{FB}$ input (pin 2) via a parallel-connected resistor 162 (having a resistance of approximately 680KΩ) and capacitor 164 (having a capacitance of approximately 0.22 μF). The current mode control IC 144 has its current sense input (pin 3) connected to the ground voltage rail 122 via a capacitor 166 (having a capacitance of approximately 470 pF) and to the source electrode of the FET 128 via a resistor 168 (having a resistance of approximately 1KΩ).

The current mode control IC 144 has its $V_{cc}$ input (pin 7) connected to the bridge rectifier output node 120 via a resistor 170 (having a resistance of approximately 94KΩ) and connected to the ground voltage rail 122 via a capacitor 172 (having a capacitance of approximately 100 μF). The current mode control IC 144 has its GND input (pin 5) connected to the ground voltage rail 122. A winding 137, wound on the same core as the inductor 24, has one end connected to the ground voltage rail 122 and has its other end connected via a diode 139 to the $V_{cc}$ input (pin 7) of the IC 144.

The power supply output terminals 134 and 136 are connected to input nodes 174 and 176 of a half-bridge inverter formed by two npn bipolar transistor 178 and 180 (each of the type BUL45). The transistor 178 has its collector electrode connected to the input node 174, and has its emitter electrode connected to an output node 182 of the inverter. The transistor 180 has its collector electrode connected to the node 182, and has its emitter electrode connected to the input node 176. Two electrolytic capacitors 184 and 186 (each having a value of approximately 100 μF) are connected in series between the inverter input nodes 174 and 176 via an intermediate node 188. For reasons which will be explained below, a resistor 190 (having a value of approximately 1M Ω) and a capacitor 192 (having a value of approximately 0.1 μF) are connected in series between the inverter input nodes 174 and 176 via an intermediate node 192.

The inverter output node 182 is connected to a series-resonant tank circuit formed by an inductor 196 (having a value of approximately 5.35 mH) and a capacitor 198 (having a value of approximately 10 nF). The inductor 196 and the capacitor 198 are connected in series, via a primary winding 200 of a base-coupling transformer 202 which will be described more fully below, between the inverter output node 182 and the node 188. The base-coupling transformer 202 includes the primary winding 200 (having approximately 8 turns) and two secondary windings 204 and 206 (each having approximately 24 turns) wound on the same core 208. The secondary windings 204 and 206 are connected with opposite polarities between the base and emitter electrodes of the inverter transistors 178 and 180 respectively. For reasons which will be explained below, the base electrode of the transistor 180 is connected via a diac 210 (having a voltage breakdown of approximately 32 V) to the node 194.

An output-coupling transformer 212 has its primary winding 214 connected in series with the inductor 196 and in parallel with the capacitor 198 and the primary winding 200 of the base-coupling transformer 202 to conduct output current from the tank circuit formed by the series-resonant inductor 196 and capacitor 198. The primary winding 214 of the transformer 212 is center-tapped at a node 215. The center-tap node 215 is coupled to the inverter input nodes 174 and 176 via a diode clamp formed by two diodes 215A and 215B. The diode 215A has its anode connected to the center-tap node 215 and has its cathode connected to the inverter input node 174. The diode 215B which has its cathode connected to the center-tap node 215 and has its anode connected to the inverter input node 176.

The output-coupling transformer 212 includes the primary winding 214 (having approximately 70 turns), a principal secondary winding 216 (having approximately 210 turns) and four filament-heating secondary windings 218, 220, 222 and 224 (each having approximately 3 turns) wound on the same core 226. The principal secondary winding 216 is connected across output terminals 228 and 230, between which the three fluorescent lamps 102, 104 and 106 are connected in series. The lamps 102, 104 and 106 each have a pair of filaments 102A & 102B, 104A & 104B and 106A & 106B respectively located at opposite ends thereof. The filament-heating secondary winding 218 is connected across the output terminal 228 and an output terminal 232, between which the filament 102A of the lamp 102 is connected. The filament-heating secondary winding 220 is connected across output terminals 234 and 236, between which both the filament 102B of the lamp 102 and the filament 104A of the lamp 104 are connected in parallel. The filament-heating secondary winding 222 is connected across output terminals 238 and 240, between which both the filament 104B of the lamp 104 and the filament 106A of the lamp 106 are connected in parallel. The filament-heating secondary winding 224 is connected across the output terminal 230 and an output terminal 242, between which the filament 106B of the lamp 106 is connected.

The integrated circuit 144 and its associated components form a voltage boost circuit which produces, when activated, a boosted output voltage between the output terminals 134 and 136. The detailed operation of such a voltage boost circuit is described more fully in, for example, U.S. patent application No. 07/665,830, which is assigned to the same assignee as the present application, and the disclosure of which is hereby incorporated herein by reference.

The transistors 178 and 180, the inductor 196, the capacitor 198 and their associated components form a self-oscillating inverter circuit which produces, when activated, a high-frequency (e.g. 40KHz) AC voltage across the primary winding 214 of the output-coupling transformer 212. The voltages induced in the secondary windings 218, 220, 222 and 224 216 of the output-coupling transformer serve to heat the lamp filaments 102A & 102B, 104A & 104B and 106A & 106B and the voltage induced in the secondary winding 216 of the output-coupling transformer serves to drive current through the lamps 102, 104 and 106. The detailed operation of such a self-oscillating inverter circuit is described more fully in, for example, U.S. patent application entitled "CIRCUIT FOR DRIVING A GAS DISCHARGE LAMP LOAD", invented by Mihail S. Moisin & Kent E. Crouse, filed on the same date as the present application, and assigned to the same assignee as the present application. The disclosure of this co-pending application is hereby incorporated herein by reference.

In operation of the circuit of FIG. 1, with a voltage of 120 V, 60 Hz applied across the input terminals 108 and 110, the bridge 112 produces between the node 120 and the ground voltage rail 122 a unipolar, full-wave rectified, DC voltage having a frequency of 120 Hz.

When the circuit is first powered-up, the activation of the voltage boost IC 144 is controlled, for reasons which will be explained below, by the resistive-capacitive divider 170, 172 connected between the output nodes 118 and 120 of the bridge circuit 112. When the bridge circuit 112 first produces the DC voltage between its output nodes 118 and 120, this current begins to flow through the resistor 170 and begins to charge the capacitor 172. The voltage across the capacitor thus increases at a rate dependent on its own value and that of the resistor 170. When the voltage across the capacitor 172 reaches the turn-on threshold value (approximately 10.5 V) of the IC 144 this voltage, applied at pin 7 of the IC 144, activates the IC to boost the voltage between the output terminals 134 and 136. Once initially activated, the winding 137 acts as a "bootstrap" voltage supply, ensuring that the IC 144 remains activated. The component values in the preferred embodiment of the circuit of FIG. 1 are chosen to produce a delay of approximately 0.7 seconds between initial power-up of the circuit and activation of the voltage boost IC 144.

If the voltage boost IC 144 is not activated, an unboosted voltage appears across the output terminals 134 and 136 and powers the self-oscillating inverter. In the circuit of FIG. 1 the unboosted voltage produced across the output terminals 134 and 136 has a value of approximately 170 V. When the self-oscillating inverter is powered by the unboosted bridge voltage it produces enough voltage in the transformer primary winding 214 for the induced currents in the secondary windings 218, 220, 222 and 224 to heat the filaments 102A & 102B, 104A & 104B and 106A & 106B, but does not produce enough voltage for the induced voltage in the secondary winding 216 to cause the lamps 102, 104 and 106 to strike.

If the voltage boost IC 144 is activated, it functions as a current mode control device, producing a signal of pulse-width modulated drive pulses at its pin 6 which controls the conduction of the FET 128. When the FET 128 is enabled to conduct, substantially the whole of the unipolar DC voltage produced by the bridge 112 appears across the inductor 124, and causes current to flow through the inductor. When the FET 128 is disabled from conducting, this inductive current causes the voltage across the inductor to increase. This increased or boosted voltage is applied through the diode 132 to the output terminal 134. The boosted voltage between the output terminals 134 and 136 charges the capacitors 184 and 186 to produce an output voltage across the output terminals 134 and 136 which powers the self-oscillating inverter. In the circuit of FIG. 1 the boosted voltage across the output terminals 134 and 136 has a value of approximately 250 V. When the self-oscillating inverter is powered by the boosted voltage it produces enough voltage in the transformer primary winding 214 for the induced voltage in the secondary winding 216 to cause the lamps 102, 104 and 106 to strike and for the induced voltage in the secondary windings 218, 220, 222 and 224 to continue to cause the filaments 102A & 102B, 104A & 104B and 106A & 106B to be heated.

It will be understood that in the self-oscillating inverter formed by the transistors 178 and 180, the inductor 196, the capacitor 198 and their associated components, the inductor 196 and the capacitor 198 form an LC series-resonant circuit which, energized by the applied boosted or unboosted voltage across the output terminals 134 and 136 via the inverter formed by the transistors 178 and 180, resonates at a nominal loaded frequency of approximately 40 KHz. The high-frequency voltage produced by the resonant circuit appears across the primary winding 214 of the transformer 212 and induces a relatively high voltage in the secondary winding 216 and relatively low voltages in the secondary windings 218, 220, 222 and 224. The relatively low voltages in the secondary windings 218, 220, 222 and 224 produce heating currents in the filaments and the relatively high voltage in the secondary winding 216 is applied across the three lamps 102, 104 and 106 in series, and will cause the lamps to strike if the voltage across the secondary winding 216 is high enough.

When the circuit is first powered-up, the activation of the self-oscillating inverter, for reasons which will be explained below, is controlled by the resistive-capacitive divider 190, 192 connected between the output terminals 134 and 136 of the voltage boost circuit formed by the IC 144 and its associated components. When the bridge circuit 112 first produces the DC voltage between its output nodes 118 and 120 and before the voltage boost IC 144 is activated, an unboosted voltage of approximately 170 V is produced across the output terminals 134 and 136. This unboosted voltage causes current to begin to flow through the resistor 190 and to begin to charge the capacitor 192. The voltage across the capacitor 192 thus increases at a rate dependent on its own value and that of the resistor 190. When the voltage across the capacitor 172 reaches the breakdown value of the diac 210 (approximately 32 V) this voltage is applied through the diac to the base of the transistor 180. This applied voltage causes the transistor 180 to turn on, and sets into operation the self-oscillating inverter formed by the transistors 178 and 180, the inductor 196, the capacitor 198 and their associated components. The component values in the circuit of FIG. 1 are chosen to produce a delay of approximately 40 milliseconds between initial power-up of the circuit and activation of the self-oscillating inverter.

As mentioned above, the circuit of FIG. 1 is so arranged that, with the self-oscillating inverter activated, when the unboosted voltage of approximately 170 V appears across the output terminals 134 and 136 the voltage induced in the secondary windings 118, 120, 122 and 124 is sufficient to produce significant heating of the filaments 102A & 102B, 104A & 104B and 106A & 106B, but the voltage induced in the secondary winding 216 is insufficient to cause the lamps to strike. However, when the boosted voltage of approximately 250 V appears across the output terminals 134 and 136 the voltage induced in the secondary windings 118, 120, 122 and 124 continues to heat the filaments and the voltage induced in the secondary winding 216 is sufficient to cause the lamps to strike. Thus, the circuit of FIG. 1 produces pre-heating of the lamp filaments before the lamps are caused to strike.

In steady-state operation of the lamps, the circuit provides regulated operation by drawing less current, if the applied voltage varies above its nominal level of 120 V, in the following way. As mentioned above, the IC 144 is of the current mode control type and when the voltage applied to pin 7 of the IC through the resistor 170 reaches approximately 10.5 V the IC will turn on and produce drive pulses at pin 6 of the IC. These drive pulses pass through the resistor 150, which limits peak current, and are applied to the gate of the FET 128. In response to applied drive voltage the FET 128 turns on and current, flowing through the resistor 130 (whose value is chosen to limit the current to a desired value), builds up through the inductor 124. This current limiting is accomplished by application of the voltage developed across the resistor 130 (via the resistor 168 and the capacitor 166) to pin 3 of the IC 144.

When the voltage applied to pin 3 of the IC 144 reaches approximately 1 V, the control cycle of the IC is terminated and the drive voltage at pin 6 drops to zero, the FET 128 turns off and the energy stored in the inductor 124 is released at the node 126 in the form of a positive-going voltage which forward biases the diode 132. A current thus flows through the diode 132 and charges the capacitors 184 and 186. The capacitors 184 and 186 act as energy storage devices and filter the power pulses produced by the inductor 124 to provide a relatively smooth DC voltage across the terminals 134 and 136. This DC voltage is regulated by the current flowing through the resistors 154 and 156: when the voltage across the nodes 134 and 136 is equal to 250 V, the current flowing through the resistor 156 produces thereacross a voltage drop of 2.5 V which is applied to pin 2 of the IC 144, and when a voltage of precisely 2.5 V is applied at the pin 2 the IC 144 will stop producing drive voltage to the FET at its pin 6. The duty cycle of the drive voltage produced at the pin 6 is limited to a maximum of 50% by the IC 144, and at full duty cycle the output of the boost converter at the terminals 134 and 136 is designed to provide more power than the load requires. The amount of output power is a function of the value of the resistor 130 and this is chosen so that the boost converter provides more power than the load needs at line voltages of 115 V and above, thus forcing the circuit into regulation.

Figure 2:
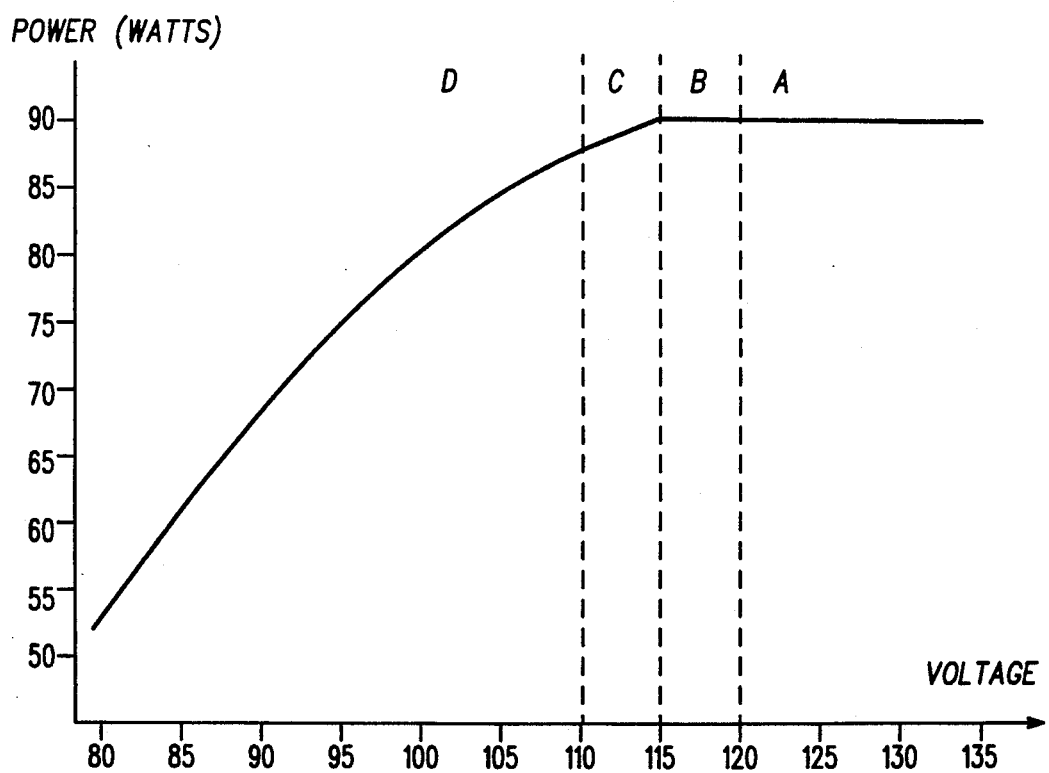
FIG. 2 shows a graph of the current drawn by the circuit of FIG. 1 in relation to the voltage applied thereto.

Referring now also to FIG. 2, which shows a graph of the power drawn by the circuit of FIG. 1 plotted against the applied line voltage, the behavior of the circuit near to and above the nominal value of the applied voltage, can be seen in regions A and B, in which the power drawn by the circuit remains constant so long as the applied voltage remains above 115 V. At line voltages less than 115 V the power output of the boost converter is not enough to maintain 250 VDC across the terminals 134 and 136 and regulation is lost.

As the applied voltage varies below its nominal level of 120 V, the circuit continues to provide regulation, maintaining constant power drawn from the line, so long as the applied voltage does not fall below 115 V. Such regulated operation below the nominal value of the applied voltage is shown in region B of FIG. 2.

In the event that the applied voltage falls below 115 V, the circuit draws less power, in the following way. As the applied voltage falls below 115 V and the above-described regulation is lost, the power drawn by the circuit of FIG. 1 falls initially at approximately the same rate as the applied voltage falls. This initial rate of fall is shown in region C of FIG. 2.

As the applied voltage continues to fall, the power drawn by the circuit of FIG. 1 is caused to fall at a faster rate than the rate of fall of the applied voltage in the following way. As the applied voltage falls, the voltage produced across the terminals 134 and 136 falls, as does the high-frequency voltage produced by the self-oscillating inverter and applied to the lamp load. As will be understood, the fluorescent lamps 102, 104 and 106, once struck, present a negative load (i.e., a load across which the current increases as the voltage across the load falls). As the voltage across the lamps falls due to falling applied line voltage, the current through the lamps increases due to their negative resistance characteristic. The increased lamp current flows through the secondary winding 216 of the output-coupling transformer 212 and is reflected back to the transformer's primary winding 214, causing an increase in the voltage across the primary winding. The increased voltage across the primary winding 216 causes the magnitude of the voltage at the center-tap node 215 to increase. When the voltage at the center-tap node 215 increases above the voltage at the inverter input node 174, the diode 215A becomes forward biased, causing the excess voltage at the node 215 to charge the capacitor 184. Similarly, when the voltage at the center-tap node 215 falls below the voltage at the inverter input node 176, the diode 215B becomes forward biased, causing the excess voltage at the node 215 to charge the capacitor 186. As the capacitors 184 and 186 charge from the diodes 215A and 215B, they supply the energy to power the self-oscillating inverter, and cause less power to be drawn from the utility mains supply line connected across the mains input terminals 108 and 110. In this way, as the applied line voltage falls below the value at which the diodes 215A and 215B become forward biased, the power drawn from the utility mains supply line is caused to fall at a greater rate than the fall in the applied line voltage. This increased rate of fall is shown in region D of FIG. 2, from which it can be seen that the rate of fall in this region is not constant but becomes even greater as the applied voltage falls further.

Thus, it will be appreciated that the power drawn by the circuit of FIG. 1 has three distinct phases: a first phase (regions A and B of FIG. 2) in which the drawn power is regulated at a constant level when the mains supply voltage is above a level slightly less than its nominal value of 120 V (approximately 95% of its nominal value); a second phase (region C of FIG. 2) in which the drawn power falls at the same rate as the mains supply voltage when the mains supply voltage falls to between approximately 95% and 90% of its nominal value of 120 V; and a third phase (region D in FIG. 2) in which the drawn power falls at a faster rate than the mains supply voltage when the mains supply voltage falls below approximately 90% of its nominal value.

Thus it will be appreciated that in its first phase (regions A and B of FIG. 2), both when the mains supply voltage rises above its nominal value and when the mains supply voltage falls to no less than approximately 95% of its nominal value, the power drawn by the circuit of FIG. 1 remains constant. In its second phase (region C level between approximately 95% and 90% of its nominal value, the power drawn by the circuit of FIG. 1 falls at the same rate as the mains supply voltage. In its third phase (region D of FIG. 2), when the mains supply voltage falls to a level less than approximately 90% of its nominal value, the power drawn by the circuit of FIG. 1 falls at a faster rate than the mains supply voltage.

Thus it will be understood that the circuit of FIG. 1 draws constant power if the mains supply voltage rises above its nominal value of 120 V or if the mains supply voltage falls to no less than approximately 95% of its nominal value of 120V, thus providing constant light output in all "normal" line conditions where the mains supply line voltage may occasionally rise above its nominal level if significant other users of the mains cease to draw power therefrom, or may occasionally fall slightly below its nominal value if significant other users of the mains begin to draw power therefrom. Alternatively, if the mains supply voltage falls below approximately 95% of its nominal value, the circuit of FIG. 1 draws reduced power. Since a fall in the mains supply voltage below approximately 95% of its nominal value is typically indicative of a "brown-out" or deliberate reduction of mains supply voltage by the electric utility in order to reduce power consumption, the reduced power drawn by the circuit of FIG. 1 under these conditions allows the electric utility to achieve its indicated aim.

It will also be understood that by providing a dual rate power reduction if the mains supply voltage falls below approximately 95% of its nominal value (a first rate, proportional to the fall in mains supply voltage, if the mains supply voltage falls to between approximately 95% and 90% of its nominal value, and a second rate, greater than the fall in mains supply voltage, if the mains supply voltage falls to less than approximately 90% of its nominal value) the circuit of FIG. 1 reduces its power drawn at different rates depending on whether the mains supply voltage is above or below a predetermined threshold, enabling the electric utility to bring about a much more rapid reduction in power consumption (if desired) by reducing the mains supply voltage below approximately 90% of its nominal value.

It will be appreciated that although in FIG. 1 there has been described a circuit for driving three fluorescent lamps, the invention is not restricted to the driving of three fluorescent lamps. It will be understood that the invention is also applicable to circuits for driving other numbers and/or types of lamps.

It will also be appreciated that the voltage levels involved in activating the different phases of power consumption in the circuit of FIG. 1, and the number of phases of reduced power consumption may be varied as desired to suit different conditions.

It will be appreciated that various other modifications or alternatives to the above described embodiment will be apparent to a person skilled in the art without departing from the inventive concept of providing reduced power consumption of a gas discharge lamp driving circuit if supply voltage to the circuit falls below a predetermined level less than the supply voltage's nominal value.

We claim:

1. A circuit for driving a gas discharge lamp load, the circuit comprising:
   input terminals for connection to a supply voltage source having a predetermined nominal voltage level;
   output terminals for connection to the gas discharge lamp load;
   oscillator means coupled to the input terminals and to the output terminals for producing a high-frequency output voltage for application to the gas discharge lamp load;
   power control means coupled to the input terminals and to the oscillator means for controlling the power drawn by the circuit from the supply voltage source, the power control means comprising:
   power reducing means for reducing the power drawn by the circuit when the voltage level of the supply voltage source falls below a first predetermined level less than the nominal level of the supply voltage source; and
   regulator means for regulating to a substantially constant value the power drawn by the circuit when the voltage level of the supply voltage source is above the first predetermined level, the regulator means comprising current mode control means and an impedance connected therewith, the impedance having a predetermined value which determines the substantially constant value of the power drawn by the circuit when the voltage level of the supply voltage source is above the first predetermined level.

2. A circuit according to claim 1 wherein the current mode control means comprises a current mode control integrated circuit.

3. A circuit according to claim 1 wherein the power reducing means reduces at a first rate the power drawn by the circuit when the voltage level of the supply voltage source falls below the first predetermined level less than the nominal level of the supply voltage source and reduces at a second rate greater than the first rate the power drawn by the circuit when the voltage level of the supply voltage source falls below a second predetermined level less than the first predetermined level.

4. A circuit according to claim 1 wherein the oscillator means comprises an inverter having an input coupled to the input terminals and having capacitance means coupled thereto, a tank oscillator coupled to the inverter and an output transformer coupled between the tank oscillator and the output terminals, and wherein the regulator means comprises a voltage clamp coupled between the output transformer and the input of the inverter for reducing the power drawn by the circuit when the voltage level of the supply voltage source falls below a second predetermined level less than the first predetermined level.

5. A circuit according to claim 4 wherein the output transformer has a primary winding to which the tank oscillator is connected and wherein the voltage clamp comprises diode means coupled between the primary winding and the input of the inverter for conducting power from the primary winding to the inverter input when the magnitude of the voltage in the primary winding exceeds a predetermined value in response to the voltage level of the supply voltage source falling below the second predetermined level.

6. A circuit according to claim 4 wherein the power reducing means reduces at a first rate the power drawn by the circuit when the voltage level of the supply voltage source falls below the first predetermined level less than the nominal level of the supply voltage source and reduces at a second rate greater than the first rate the power drawn by the circuit when the voltage level of the supply voltage source falls below the second predetermined level.

7. A circuit according to claim 1 wherein the nominal level of the supply voltage source has a voltage of substantially 120 volts.

8. A circuit according to claim 7 wherein the first predetermined level has a voltage of substantially 115 volts.

9. A circuit according to claim 3 wherein the second predetermined level has a voltage of substantially 110 volts.

10. A circuit for driving a gas discharge lamp load, the circuit comprising:
input terminals for connection to a supply voltage source having a predetermined nominal voltage level;
output terminals for connection to the gas discharge lamp load;
oscillator means coupled to the input terminals and to the output terminals for producing a high-frequency output voltage for application to the gas discharge lamp load;
power regulation means coupled to the input terminals and to the oscillator means for regulating to a substantially constant value the power drawn by the circuit when the voltage level of the supply voltage source is above a first predetermined level less than the nominal level of the supply voltage source; and
voltage clamp means coupled to the oscillator means for reducing the power drawn by the circuit when the voltage level of the supply voltage source falls below the first predetermined level.

11. A circuit according to claim 10 wherein the power drawn by the circuit reduces at a first rate when the voltage level of the supply voltage source falls below the first predetermined level less than the nominal level of the supply voltage source and reduces at a second rate greater than the first rate when the voltage level of the supply voltage source falls below a second predetermined level less than the first predetermined level.

12. A circuit according to claim 10 wherein the oscillator means comprises an inverter having an input coupled to the input terminals and having capacitance means coupled thereto, a tank oscillator coupled to the inverter and an output transformer coupled between the tank oscillator and the output terminals, and wherein the voltage clamp means comprises a voltage clamp coupled between the output transformer and the input of the inverter for reducing the power drawn by the circuit when the voltage level of the supply voltage source falls below a second predetermined level less than the first predetermined level.

13. A circuit according to claim 12 wherein the output transformer has a primary winding to which the tank oscillator is connected and wherein the voltage clamp comprises diode means coupled between the primary winding and the input of the inverter for conducting power from the primary winding to the inverter input when the magnitude of the voltage in the primary winding exceeds a predetermined value in response to the voltage level of the supply voltage source falling below the second predetermined level.

14. A circuit for driving a gas discharge lamp load, the circuit comprising:
input terminals for connection to a supply voltage source having a predetermined nominal voltage level;
output terminals for connection to the gas discharge lamp load;
oscillator means coupled to the input terminals and to the output terminals for producing a high-frequency output voltage for application to the gas discharge lamp load;
power regulation means coupled to the input terminals and to the oscillator means for regulating to a substantially constant value the power drawn by the circuit when the voltage level of the supply voltage source is above a first predetermined level less than the nominal level of the supply voltage source; and
power reducing means for reducing at a first rate the power drawn by the circuit when the voltage level of the supply voltage source falls below the first predetermined level and for reducing at a second rate greater than the first rate the power drawn by the circuit when the voltage level of the supply voltage source falls below a second predetermined level less than the first predetermined level.

15. A circuit according to claim 14 wherein the oscillator means comprises an inverter having an input coupled to the input terminals and having capacitance means coupled thereto, a tank oscillator coupled to the inverter and an output transformer coupled between the tank oscillator and the output terminals, and wherein the regulator means comprises a voltage clamp coupled between the output transformer and the input of the inverter for reducing the power drawn by the circuit when the voltage level of the supply voltage source falls below a second predetermined level less than the first predetermined level.

16. A circuit according to claim 15 wherein the output transformer has a primary winding to which the tank oscillator is connected and wherein the voltage clamp comprises diode means coupled between the primary winding and the input of the inverter for conducting power from the primary winding to the inverter input when the magnitude of the voltage in the primary winding exceeds a predetermined value in response to the voltage level of the supply voltage source falling below the second predetermined level.

* * * * *